United States Patent [19]
Sodickson et al.

[11] 3,912,452
[45] Oct. 14, 1975

[54] METHOD AND APPARATUS FOR PHOTOMETRIC ANALYSIS OF LIQUID SAMPLES

[75] Inventors: Lester A. Sodickson, Newton; Stanley P. Mickiewicz, Medfield, both of Mass.

[73] Assignee: Damon Corporation, Needham Heights, Mass.

[22] Filed: Dec. 13, 1973

[21] Appl. No.: 424,297

[52] U.S. Cl. ........... 23/230 R; 23/230 B; 23/253 R; 23/259; 356/181; 356/246
[51] Int. Cl. ...................... G01n 21/26; G01n 33/16
[58] Field of Search .......... 23/230 R, 230 B, 253 R, 23/259; 356/181, 201, 246

[56] References Cited
UNITED STATES PATENTS

| | | | |
|---|---|---|---|
| 3,241,432 | 3/1966 | Skeggs et al. | 23/230 X |
| 3,480,369 | 11/1969 | Smythe et al. | 23/253 X |
| 3,690,833 | 9/1972 | Ferrari | 23/253 X |
| 3,700,562 | 10/1972 | Morgenstern et al. | 23/253 X |
| 3,784,310 | 1/1974 | Barton et al. | 23/259 X |
| 3,804,593 | 4/1974 | Smythe et al. | 23/230 R |

*Primary Examiner*—R. E. Serwin
*Attorney, Agent, or Firm*—Kenway & Jenney

[57] ABSTRACT

A photometric fluid analysis instrument, which receives plural liquid samples in serial succession via the same conduit, attains accurate and precise measurement of each sample with minimal error carry-over of material from one sample to the next by employing the leading-edge portion of each sample for cleansing the conduit and by examining a subsequent portion for the measurement. The instrument controls the delivery of sample material to the photometer cuvette with a sample sensor upstream of the cuvette. A further sample sensor is connected with the first sensor for producing the desired fluid-controlling signal with automatic self-compensation with regard to the sample parameter being sensed.

19 Claims, 3 Drawing Figures

U.S. Patent  Oct. 14, 1975  3,912,452
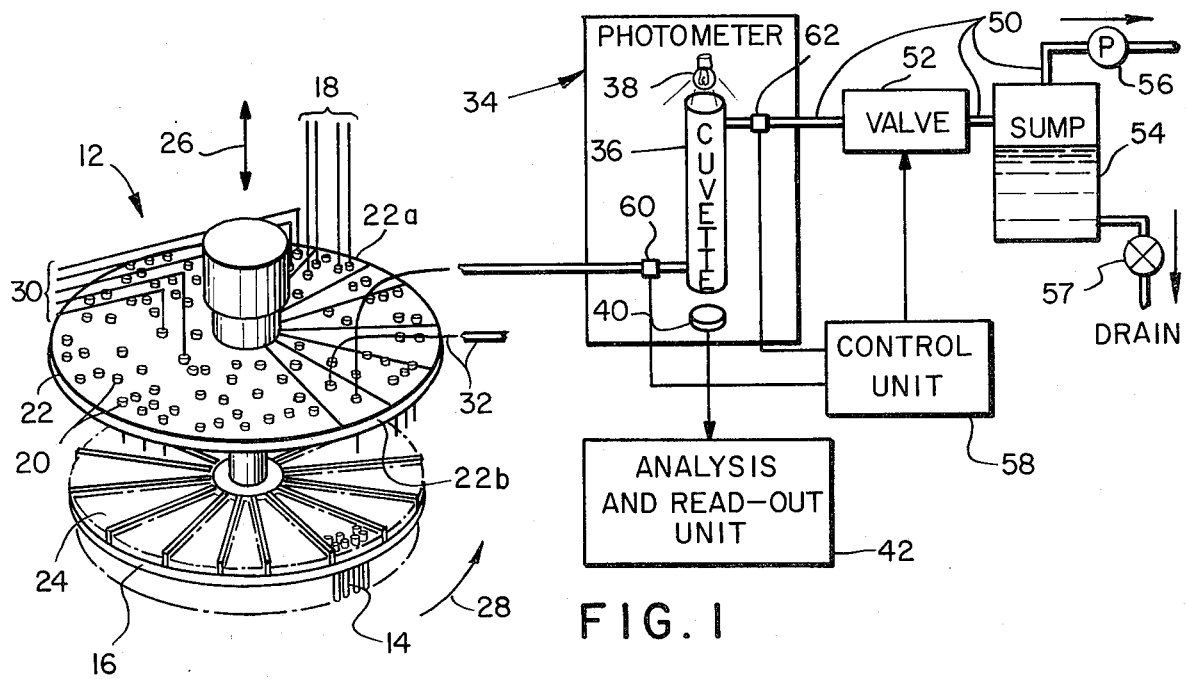
FIG. 1
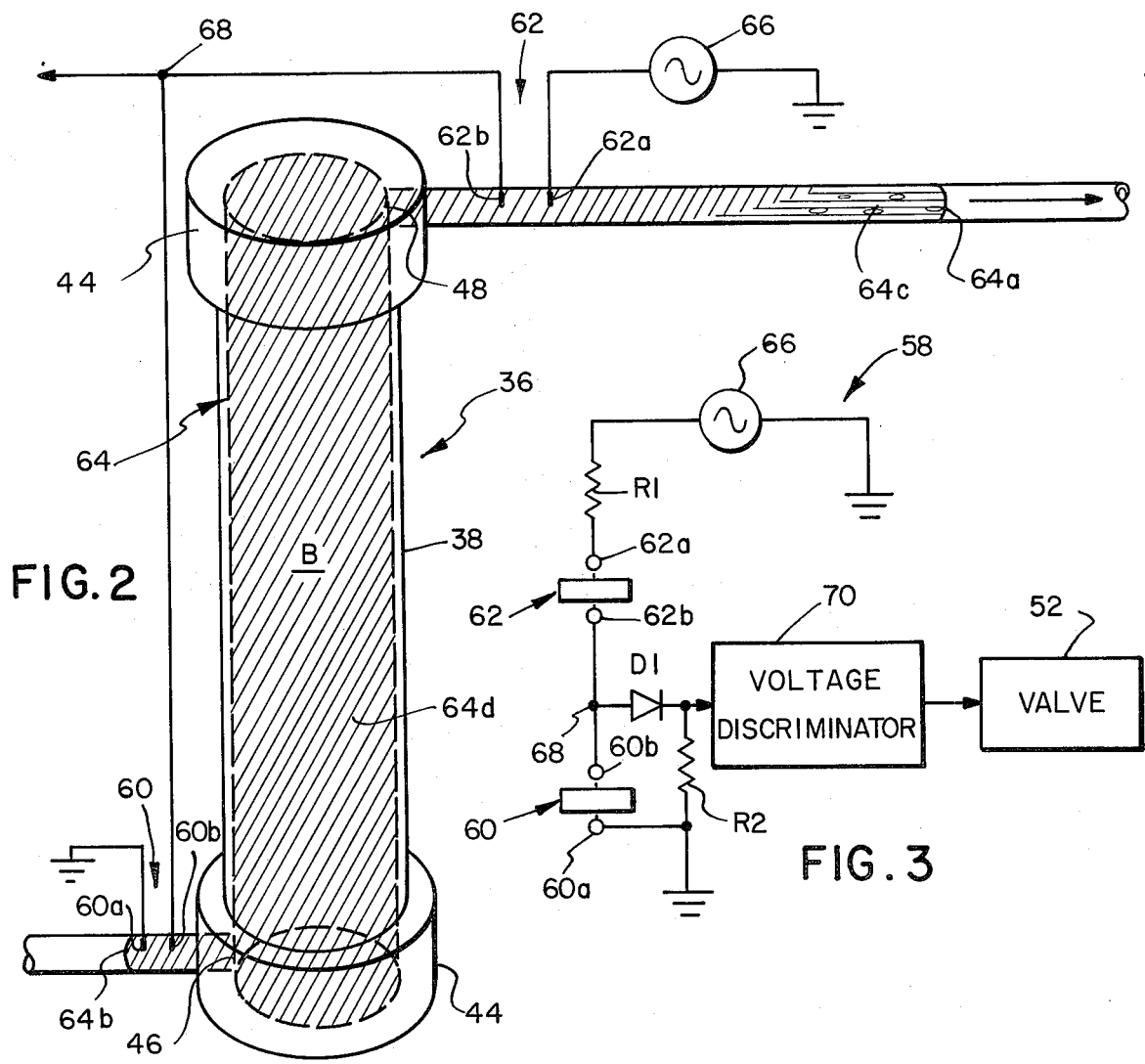
FIG. 2
FIG. 3

METHOD AND APPARATUS FOR PHOTOMETRIC ANALYSIS OF LIQUID SAMPLES

BACKGROUND

This invention relates in general to automatic fluid analysis apparatus. More specifically, the invention provides a novel instrument and method for the photometric analysis of successive liquid samples and having, among other advantages, a significant increase in the fidelity of each sample portion being measured, in spite of contamination from prior liquids in the system.

One use of photometric fluid analysis instruments is to determine the levels of various constituents in body fluids such as blood and urine. An example of this type of fluid analysis instrument is disclosed in the commonly-assigned, U.S. Pat. No. 3,764,268, issued Oct. 9, 1973, to Kosowsky et al., for "Constituents-Measuring Chemical Analyzer Having Sample-Processing Conduit Feeding Aliquot-Processing Conveyor System". Each channel of this multi-channel instrument, which is noted only as an illustrative example, reacts sample liquid with one or more chemical reagents to produce a constituent-measuring reaction. The amount of constituent present in the original sample is determined by photometrically measuring the change in optical absorption, at a selected wavelength, which the reaction produces.

This photometric measurement is performed with a photometer sight tube or cuvette that holds the reacted sample liquid in the optical path between a light source and a photodetector. After the measurement, the reacted sample is discharged and the system cleansed with a wash fluid and a drying gas. Thereafter, another reacted sample is delivered to the cuvette. One or more valves actuated by fluid-responsive sensors typically are used to control the delivery of the reacted sample to the photometer cuvette.

Photometric instruments of this type experience difficulty in thoroughly removing from the cuvette and its supply conduit all traces of a reacted sample and the wash liquid. As a result, the leading portion of the next reacted sample absorbs these carry-over contaminants as it passes through the conduit and the cuvette. The presence of this contaminated and/or diluted sample portion in the cuvette of conventional instruments has caused inaccuracies in the measurement and poor correlation between successive measurements. This problem is particularly acute in instruments that use air to separate successive samples, each with its associated wash liquid as opposed to instruments that use air to segment the samples and wash liquids.

Conventional photometric analysis instruments are also subject to another disadvantage in that the sample-valving mechanism can malfunction if the sensor signals vary with the type or concentration of sample or reaction product being analyzed. These variances must therefore be compensated, which often requires manual adjustments in the control circuit. Measurement errors can also result when the instrument fails to valve the sample properly so that the sample does not completely fill the cuvette; the resolution of this and other problems has heretofore required that the sensor be selectively spaced from the cuvette to assure correlation between readings taken with different photometers.

Accordingly, it is a principal object of this invention to provide a photometric fluid analysis instrument of the foregoing type which does not include carryover contamination in the measured portion of the liquid sample.

Another object is to provide such a photometric fluid analysis instrument that attains highly accurate and consistent measurements with only a minimal volume of reacted sample.

A further object is to provide such a photometric fluid analysis instrument of the foregoing type which is self-compensating for variances between liquid samples in the sample parameter being sensed to control the delivery of the samples to the cuvette.

Still another object is to provide such a photometric fluid analysis instrument that will only measure a liquid sample large enough to completely fill the cuvette.

Yet a further object is to provide such a photometric fluid analysis instrument which does not require the selective placement of the sample sensor to achieve accurate and consistent measurements.

SUMMARY OF THE INVENTION

A photometric fluid analysis instrument according to the invention controls the delivery of sample liquid to a cuvette by stopping the trailing edge of the sample at a selected point upstream, or ahead of, the cuvette. This control ensures that the diluted and/or carry-over contaminated, leading portion of the sample has passed through and beyond the cuvette. As a result, the highest fidelity, trailing portion of the sample is within the cuvette and hence is measured. This control of the sample also ensures that the trailing portion of a sample is held in the cuvette for measurement without regard to the sample volume and without selective placement of the sample-controlling sensor, as many prior instruments require.

The foregoing control of the delivery of sample liquid to a cuvette is attained, in accordance with the invention, by means of a sample sensor located upstream of the cuvette which responds to the passage of the trailing edge of the sample liquid.

A further feature of the invention enables the sample-controlling signal of the sensor to be essentially independent of variations in the parameter, e.g. conductivity, dielectric constant or optical density, of the sample to which the sensor responds. The practice of this feature of the invention involves providing a second sample sensor arranged to monitor the same sample material as the first sensor, and connected with the first sensor in a differential or balanced type circuit.

These and other objects and features of the invention will be apparent from the following detailed description and in conjunction therewith, the accompanying drawings.

BRIEF DESCRIPTION OF THE DRAWINGS

FIG. 1 is a pictorial representation, partly in block form and partly schematic, of a photometric fluid analysis apparatus in accordance with this invention.

FIG. 2 is a detailed view of the sensor devices and cuvette shown in FIG. 1 with a fluid sample segment having just passed the upstream sensor and in position for measurement by the photometer.

FIG. 3 is a schematic diagram of an electronic sensing and control circuit in accordance with this invention.

DETAILED DESCRIPTION OF THE PREFERRED EMBODIMENTS

With reference to FIG. 1 a photometric liquid constituents analyzer embodying the invention has a transfer unit 12 that receives, from branch conduits 18, aliquots of a single liquid sample and that discharges, via discharge tubes 20, each aliquot into a separate reaction container 14 carried on a conveyor 16. The conduits 18 and discharge tubes 20 are arranged to deliver all aliquots derived from a single sample to containers 14 located in a single sector 24 of the conveyor 16.

A typical sequence of operation commences with the conduit branches 18 delivering, by way of the transfer unit discharge tubes, aliquots of a sample to containers 14 in a sector 24 of the conveyor. The transfer unit then rises relative to the conveyor, as arrow 26 indicates, and the conveyor rotates incrementally, as indicated with arrow 28, to advance another, following sector 24 under the conduits 18. With the transfer unit again lowered, containers 14 holding samples receive chemical reagents from reagent conduits 30; the delivery of the reagents to the different containers is in accordance with known procedures for providing the desired analyses and is not part of this invention. When a reacted liquid sample is conveyed to position 22b, it is withdrawn to a photometer for measurement. The illustrated instrument employs a separate photometer for each constituent being measured and hence has many. Only one such photometer 34 is shown; however, it receives reacted sample from a conveyed container 14 by way of a conduit 32 connected to the transfer unit 12.

Subsequent to the removal of reacted samples to the photometers, the containers 14 receive wash liquids. After removal of the wash liquid via conduits 32 (of which only a few are shown), warm dry air or other drying gas is flushed through the containers 14 and conduits 14. The wash and the drying fluids are introduced to the containers 14 via the transfer unit 12, and are withdrawn from the containers and into the conduits 32 and photometers by way of pumps 56, of which FIG. 1 shows a typical one connected with this illustrated photometer 34. As also shown, the fluid path downstream from each conduit 32 includes, in succession, a photometer cuvette 36, a valve 52, a sump 54 having a drain valve 57, the pump 56, and the interconnecting conduit 50. The pump 56 provides the motive force for aspirating the samples, the wash liquids and the drying gases from the containers 14, and to advance them through the conduits 32 and 50 and the cuvette 36.

With further reference to FIG. 1, the photometer 34 has a cuvette or flow cell 36 coupled to receive the fluids aspirated into the conduit 32. The sight path of the cuvette 36 is in optical alignment between a lamp or other source 38 of radiant energy and a photodetector 40. Accordingly, the radiation transmitted through the cuvette 36 impinges on the photodetector 40, which converts the incident electro-magnetic energy into an electrical signal. In response to this photodector signal, an analyzer and read-out unit 42 identifies the concentration or amount of a particular constituent in the initial sample.

With reference to FIG. 2, the illustrated cuvette 36 has an elongated tubular member 38 closed at both ends with caps 44. One cap has an inlet passage 46 in fluid communication with the conduit 32 and the other cap has an outlet passage 48 coupled to the discharge conduit 50.

A valve control unit 58 operates the valve 52 to allow fluids to advance toward the sump 54 when the valve is open and, alternatively, to stop the fluid advance when the valve is closed. The control unit 58 responds to signals from fluid sensing means illustrated as a pair of sensors arranged as an upstream sensor 60 and a downstream sensor 62.

Each sensor 60 and 62 illustrated in FIG. 2, is a conductivity sensor having a pair of spaced electrodes 60a, 60b, and 62a, 62b, respectively. The electrodes are planted in the conduits 32 and 50 for exposure to the fluid therein, and the electrodes of each pair preferably are spaced a short distance from each other along the conduit length. Each sensor 60, 62 functions as a variable resistor, having an essentially open-circuit resistance when its electrodes are immersed in a high resistance material such as air and having a significantly smaller resistance when a fluid such as a reacted sample bridges its electrodes. The differences in sensor conductivity is used to produce, detailed below, an electrical signal in response to the passage under the sensors 60 and 62 of a liquid-gas interface.

FIG. 2 shows a reacted sample 64 positioned in the cuvette 36 for measurement. As the segment 64 passes through the conduit 32 and the cuvette 36 prior to attaining the position shown, its leading edge 64a picks up any residual materials in the flow passage, such as carry-over contaminants from previously processed samples and droplets of wash liquid that were not removed by the drying gas. When the reacted sample has reached the position illustrated in FIG. 2, the carry-over materials and wash liquids are intermixed with the initial, leading volume of the reacted sample to produce a contaminated leading portion 64c of the sample.

A principle purpose and achievement of this invention is to remove this contaminated portion of each reacted sample from the photometer cuvette during measurement, and to do so on a reliably consistent basis and with minimal cost. The invention achieves this (as FIG. 2 shows) by retaining only the trailing portion 64d of each sample in the cuvette during measurement. This portion of the reacted sample is substantially free of contamination and of dilution, so that the resultant measurement has maximal accuracy and precision.

To realize this aspect of the invention, one sensor 60 is located closely upstream of the cuvette as illustrated. The control unit 58 includes control elements that normally maintain the valve 52 open, and which respond to the passage of the trailing edge 64b of the sample by this upstream sensor 60, to generate a signal which triggers the control unit 58 to close the valve 52. As a result, as FIG. 2 shows, the contaminated sample portion 64c is located in the discharge conduit 50, not the cuvette 36, during the measurement. To ensure that the portion 64c is downstream of the cuvette, the sensor 60 is located relatively close to the cuvette inlet passage 46. In particular, if the minimum volume of a sample 64 is designated as A, and the volume capacity of the cuvette is designated as B, then the volume C defined by the portion of the conduit 32 lying between the sensor 60 and the inlet passage 46 must be at least less than the difference between A and B. If C is greater than this difference, then the sample 64 does not completely fill the cuvette and the photometer measurement will be inaccurate. If C equals this difference, then the sample will fill the cuvette, but the diluted and contaminated portion 64c will be included in the measured sample segment, also causing an error in the measurement. Ideally, the volume C is as small as practical without introducing un-reliability, so that the maximal sample volume is downstream of the cuvette during measurement and has cleansed away contaminants. However, where the trailing portion of the sample is subject to the inclusion of bubbles, as might be entrained when the conduit 32 is removing liquid from the container in the position 22b, the sensor 60 must be spaced sufficiently from the passage 46 so that the cuvette does not receive any of the bubbles.

FIGS. 2 and 3 illustrate another aspect of the invention in which a second sensor, i.e. sensor 62, is provided. The second sensor is arranged with sensor 60 to produce the desired sample-controlling signal with minimal signal variation due to changes in the fluid parameter, e.g. resistance, to which the sensors respond. When the second sensor 62 is employed, the volume relationships described above must be modified to account for a sample volume D between the cuvette outlet passage 48 and the sensor 62. In particular with this arrangement, the minimal sample volume A must be at least equal to the sum of the volumes B, C, and D.

With further reference to FIGS. 2 and 3, the sensors 60 and 62 are connected to the control unit 58 in different arms of a voltage divider. An alternating-current voltage source 66 supplies electrical potential through a current-limiting resistor R1 to the sensor electrode 62a. The electrodes 60b and 62b, which are the electrodes closest to the cuvette 36, are electrically connected together at a point 68 and are therefore at the same electrical potential. The remaining electrode 60a is grounded, as is the other side of source 66. The sensors are connected to a voltage discriminator 70 at the point 68; the illustrated connection is through a rectifying diode D1. A resistor R2, having one side connected to the diode D1 cathode and the other side grounded, in effect shunts sensor 60.

When both sensors are not covered by sample liquid, and when the sample leading edge 64a covers only the upstream sensor 60, the potential at point 68 remains near ground. However, when the sample 64 advances to cover both sensors 60 and 62, the sensors act as a potential divider, and the potential at point 68 rises, but to a selected value that is insufficient to actuate the discriminator 70. This state continues until the trailing edge 64b of the sample 64 uncovers the upstream sensor 60 (FIG. 2). At this point, the sensor 60 presents essentially an open circuit and the output potential to the discriminator rises to beyond the selected value which actuates it to close valve 52. Accordingly, the sample is held stationary in the desired condition of FIG. 2 for measurement. After the photometric measurement of the sample, the control unit 58 reopens the valve 52, and the sample 64 advances to uncover the downstream sensor 62, thus returning the circuit to its initial state.

In an illustrative embodiment, R1 has a resistance of one kilohm, R2 a resistance of 3 megohms, and the sensors are so configured that the sample-immersed resistance of sensor 60 is in the range of 2 to 5 times larger than the sample-immersed resistance of sensor 62. The preferred ratio of the sensor resistances is three to one, corresponding to comparable interelectrode spacings provided that all of the electrodes are mounted in tubing having the same diameter. With this construction and a 9-volt source 62, the potential at point 68 rises to approximately one-third the supply voltage, i.e. 3 volts, when both sensors are immersed in sample, and has a value near that of the supply voltage, i.e. of approximately 9 volts, when both are so immersed. The threshold voltage of the discriminator 70 for the foregoing component values is 4½ to 5 volts.

When the downstream sensor 62 is utilized in the foregoing manner, the sensing circuit has, as indicated above, the advantage of being self-compensating for the parameter of the liquid sample which is sensed. In the illustrated embodiment, the sensors are responsive to the conductivity of the sample. By using two sensors connected in separate branches of a potential divider, changes in the sample conductivity, do not affect the value of the output voltage to the discriminator. This is because conductivity changes at one sensor are compensated, or balanced, by conductivity changes at the second sensor. In contrast, conventional sensor circuits have only a single sensor and employ a variable resistor which must be manually reset for samples having varying conductivities in order to properly trigger the voltage discriminator.

The present upstream and downstream arrangement of two sensors also has the advantage of acting as a check on the size of the sample 64. If, as by error or malfunction, a sample is so small that it does not bridge both sensors simultaneously and hence is not likely to fill the cuvette, the potential at point 68 does not rise sufficiently to actuate the discriminator. As a result, the sample will not be measured. Where desired, an alarm mechanism can be provided to report this condition and/or shut down the instrument.

The sensing circuit described above has the further advantage of not applying any current across the sample portion in the cuvette during a measurement. This is because the electrodes 60b and 62b are at the same potential. Also the use of alternating current in the sensing circuit precludes corrosion or plating of the electrodes, as found in conventional analysis devices using direct current.

One example of a photometric fluid analysis instrument embodying this invention to process a reacted sample having a minimum volume of 500 lambda (500 × 10⁻⁶ liter) has a cuvette with a capacity to hold 250 lambda. The conduit 32 has an internal volume of approximately 1,000 lambda. During a single wash cycle, the instrument will use three thousand to seven thousand lambda of wash liquid. The volume C defined by the upstream sensor 60 and the inlet passage 46 is typically 10 to 20 lambda.

An alternate mode of operating an analyzer according to this invention is to measure the sample without bringing it to a full stop in the cuvette 36. In this mode, the upstream sensor 60 is used to trigger the measurement. It should be noted that the sensor 60 can also be used to sound an alarm which can be included in the control unit 58, to provide for further monitoring of a measurement.

Although the sensors 60 and 62 have been described as conductivity sensors, they can be responsive to any parameter of the liquid sample which will adequately indicate its presence, such as optical density. Further, the self-compensating operation described above can be realized even when the second sensor, i.e. sensor 62 is located elsewhere than the downstream location which FIG. 2 shows. Other placements can be used, and it is within the skill of the art to modify the circuit of FIG. 3 accordingly in view of the teachings herein. These and various other modifications will become apparent to those skilled in the art from the foregoing description and accompanying drawings. Such modifications are intended to fall within the scope of the appended claims.

Having thus described the invention, what is claimed is:

1. In photometric analysis apparatus for plural liquid samples received in succession and each normally having a volume in excess of a minimal value, and having a fluid passage which successively includes inlet conduit means, an analysis cuvette, and outlet conduit means, the improvement comprising
   A. a first sensor coupled with the inlet conduit means and producing a first signal responsive to a selected parameter of fluid therein,
   B. a first volumetric capacity, in said fluid passage between the coupling of said sensor with said inlet conduit means and the juncture of said cuvette with said outlet conduit means, less than such minimal sample volume, and
   C. measuring means for photometrically measuring sample liquid in said cuvette, said measuring means being connected with said sensor and being conditioned to effect such measurement in response to the signal which said sensor produces upon the passage thereby of a trailing sample liquid-gas interface.

2. In photometric apparatus as defined in claim 1 the further improvement comprising alarm means for producing a perceptible alarm in response to the signal which said sensor produces upon the passage thereby of a trailing liquid sample-gas interface.

3. In photometric apparatus as defined in claim 1 the further improvement comprising a second sensor coupled with the fluid passage and producing a second signal responsive to said selected parameter of fluid therein, said second sensor being connected in circuit with said first sensor to offset changes in the signal from said first sensor due to variations of such parameter in the liquid sample.

4. In photometric apparatus as defined in claim 3 the further improvement wherein said second sensor is coupled with the fluid passage at the outlet conduit means, and wherein said fluid passage has a second volumetric capacity therein between the juncture of said cuvette and said outlet conduit means and the coupling of said second sensor with said outlet conduit means, said second capacity being less than the difference between such minimal sample volume and said first capacity.

5. In photometric analysis apparatus for plural liquid samples received in succession and each normally having a volume in excess of a minimal value, and having a fluid passage which successively includes inlet conduit means, an analysis cuvette, outlet conduit means, and valve means for selectively blocking or allowing flow in said passage, the improvement comprising
   A. a first sensor coupled with the inlet conduit means for sensing the passage therein of a sample liquid-gas interface,
   B. a first volumetric capacity, in said fluid passage between the coupling of said sensor with said inlet conduit means and the juncture of said cuvette with said outlet conduit means, less than such minimal sample volume, and
   C. valve control means connected with said first sensor and coupled with said valve means, said control means responding to the signal which said sensor produces upon the passage thereby of a trailing sample liquid-gas interface to place the valve means in the condition which blocks said passage, so that the trailing portion of a liquid sample is held in said first capacity of such fluid passage.

6. In photometric apparatus as defined in claim 5 the further improvement comprising a second sensor coupled with the fluid passage for sensing the passage therein of sample liquid during the passage of such trailing interface by said first sensor, said first sensor and said second sensor sensing the same fluid parameter, and said second sensor being connected in circuit with said first sensor to offset changes in the signal from said first sensor due to variations of such parameter in the liquid sample.

7. In photometric apparatus as defined in claim 5 the further improvement
   A. comprising a second sensor coupled with the outlet conduit means and producing a second signal responsive to a selected parameter of fluid therein, and
   B. in which said valve control means is connected with said second sensor and places the valve means in such blocking condition only when said second signal is responsive to the presence of sample liquid in said outlet conduit means.

8. In photometric apparatus as defined in claim 5 the further improvement in which said valve control means includes means for normally maintaining said valve means in the condition for allowing flow in said passage.

9. In photometric apparatus as defined in claim 7 the further improvement
   A. wherein each sensor has first and second electrodes disposed within said fluid passage and responds to the electrical impedance between said electrodes, and said first electrodes are located nearer to said cuvette than said second electrodes, and
   B. further comprising circuit means maintaining said first electrodes at the same electrical potential.

10. Photometric analysis apparatus for liquid segments received in succession separated by gas segments, said apparatus comprising in combination
   A. a photometer cuvette having an inlet port and an outlet port,
   B. an inlet conduit connected with said cuvette for feeding such fluids to the inlet port,
   C. an outlet conduit connected with said cuvette for carrying such fluids from said outlet port,
   D. a first sample sensor for producing a first signal responsive to a selected parameter of the fluid present at a selected location in said inlet conduit,
   E. a second sample sensor for producing a second signal responsive to said selected parameter of the fluid present at a selected location in said outlet conduit, and
   F. measurement control means connected with said first and second sensors, said control means normally disabling said apparatus from photometrically measuring the fluid in said cuvette and enabling said measurement in response to sensor signals produced when said second sensor senses sample liquid in said outlet conduit and said first sensor senses the transition from sample liquid to gas in said inlet conduit.

11. Photometric analysis apparatus as defined in claim 10 further characterized in that said measurement control means includes means for normally maintaining the fluid flow passage through said conduits and cuvette open, and for selectively blocking such fluid flow passage in response to said sensor signals produced when said second sensor senses sample liquid in said outlet conduit and said first sensor senses the transition from sample liquid to gas in said inlet conduit.

12. Photometric analysis apparatus as defined in claim 10 further characterized in that each said sensor is a conductivity sensor and has a pair of electrodes disposed within the associated conduit spaced apart along the conduit length.

13. Photometric analysis apparatus as defined in claim 10, further characterized in that said control means includes
 A. valve means connected in said outlet conduit with said second sensor intermediate said valve means and said cuvette,
 B. an electrical source connected in series succession with said sensors, and
 C. a valve actuating circuit for closing said valve to block fluid passage therethrough in response to a selected value of the electrical potential at the interconnection of said first and second sensors.

14. Photometric analysis apparatus as defined in claim 13 further characterized in that
 A. said second sensor is in series between said source and a first point to which said actuating circuit is connected, and
 B. a resistor is electrically in parallel with said first sensor between said first point and said source.

15. Photometric analysis apparatus as defined in claim 13 further characterized in that said source produces an alternating-current voltage.

16. In the photometric analysis of fluid wherein plural liquid samples, each of which normally has a volume in excess of a minimal value, are advanced in succession through a fluid passage which successively includes inlet conduit means, an analysis cuvette and discharge conduit means, the improvement comprising the successive steps of
 A. monitoring a parameter of the fluid present in said inlet conduit means at a location such that the capacity of said passage between the location and the exit of said cuvette to said discharge conduit means is less than said minimal volume value,
 B. producing, in response to said monitoring, a first signal when a trailing sample liquid-gas interface is monitored, and
 C. photometrically measuring a property of the fluid in said cuvette in response to said first signal.

17. In the photometric analysis of fluid as defined in claim 16, the further improvement characterized by
 A. providing first sensor means for effecting said monitoring in said inlet conduit,
 B. providing second sensor means responsive to the same fluid parameter as said first sensor, and
 C. exposing said second sensor to said sample liquid to offset changes in said signal from said first sensor due to variations in the parameter of the liquid sample being sensed by both said first and said second sensors.

18. A method of photometric fluid analysis wherein plural liquid samples, each of which normally has a volume in excess of a minimal value, are advanced in succession through a fluid passage which successively includes inlet conduit means, an analysis cuvette and discharge conduit means and wherein the volume capacity of said cuvette is less than said minimal value, said method having the improvement comprising the successive steps of
 A. sensing the passage of a sample liquid-gas interface in said inlet conduit means at the location where the volume capacity within said inlet conduit means between such location and said cuvette is less than the difference between such minimal sample volume and the volume of said cuvette,
 B. stopping said fluid advance in response to said sensing,
 C. measuring said sample in said cuvette, and
 D. discharging said sample from said cuvette through said discharge conduit means.

19. A method of photometric fluid analysis as defined in claim 18, further characterized by the steps of
 A. providing first and second sensors,
 B. positioning said first sensor along said inlet conduit means to signal the passage of said liquid-gas interface, and
 C. exposing said second sensor to said sample to offset changes in said signal from said first sensor due to variations in the parameter of the liquid sample being sensed by said first sensor.

* * * * *